Figure 1:
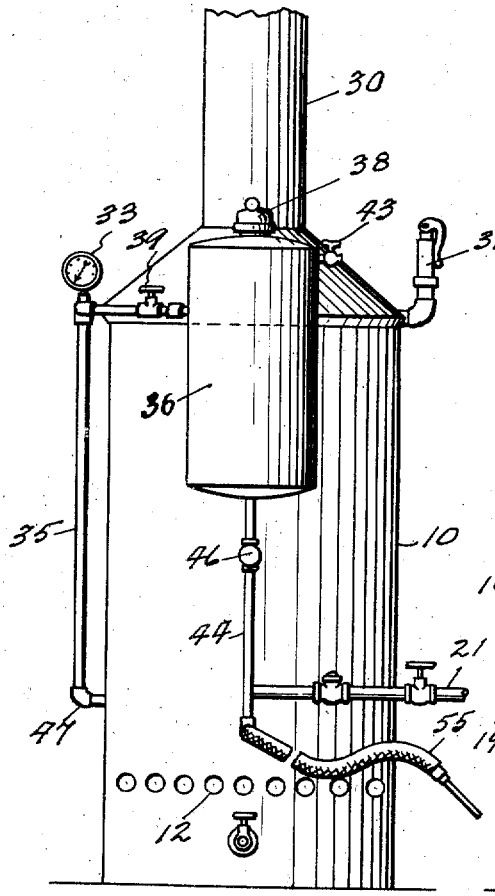

July 3, 1928. Re. 17,021

S. A. WIER

STEAM CLEANING METHOD AND APPARATUS

Original Filed Sept. 5, 1924 3 Sheets-Sheet 1

Inventor
S. A. Wier.

Attorney

July 3, 1928. Re. 17,021

S. A. WIER

STEAM CLEANING METHOD AND APPARATUS

Original Filed Sept. 5, 1924 3 Sheets-Sheet 2

Inventor
S. A. Wier

By Jack A. Ashley

Attorney

July 3, 1928. Re. 17,021

S. A. WIER

STEAM CLEANING METHOD AND APPARATUS

Original Filed Sept. 5, 1924 3 Sheets-Sheet 3

Inventor
S. A. Wier.
By Jack A. Ackley
Attorney

Reissued July 3, 1928.

Re. 17,021

UNITED STATES PATENT OFFICE.

STUART A. WIER, OF DALLAS, TEXAS.

STEAM-CLEANING METHOD AND APPARATUS.

Original No. 1,607,034, dated November 16, 1926, Serial No. 736,142, filed September 5, 1924. Application for reissue filed May 5, 1928. Serial No. 275,533.

This invention relates to new and useful improvements in steam generating and surface treating methods and apparatuses.

The use of steam as an agent for removing grease, dirt and other accumulations from the surfaces of automobiles and other surfaces has been suggested, but its use alone, or its generation for use, at any fixed temperature and pressure, is open in one way or another to decided objections.

If superheated steam, as such, or saturated steam of fairly high temperature and pressure alone is used, its temperature is high enough to damage painted and varnished surfaces. Such a steam, for example, can not be used to cleanse the body of an automobile without blistering or causing other damage to the paint and varnish thereof. If such steam is used to free the chassis and parts of the running gear of an automobile from grease and dirt, it is not only liable to cause injury to the surface finish of the running gear but will rise in a cloud and cause at least permanent discoloration of the paint and varnish of the vehicle body.

If, on the other hand, steam of low temperature and pressure is used, the steam may have sufficient heat and watery content to partially loosen the surface accumulations, but its pressure will be insufficient to blow the partly loosened or freed surface accumulations away.

In order to secure a reliable and efficient cleansing action, particularly for the removal of oil, grease, caked dust and mud, it is necessary that the heated cleansing agent be in a watery condition or watery vapor state for immediate condensation on coming in contact with the surface for a washing action, of sufficiently high temperature to free the oil, grease and caked accumulations, while of sufficiently low temperature to prevent injury to the paint and varnish, and it must also be under sufficient pressure to dislodge the oil, grease, mud and caked dirt loosened by the action of the heat and to cause a washing action through the movement of the water of condensation over the surface.

I have discovered a method of applying a steam cleansing agent in this necessary and desirable condition and which obviates the objections to the use of steam of any fixed temperature or pressure, this discovery consisting in a new mode of production of a cleansing jet by the generation and admixture of bodies of steam of two different temperatures and pressures, which immediately become balanced in pressure, whereby a cleansing jet consisting of atomized particles of hot water and water vapor under sufficient velocity to dislodge and wash away the surface accumulations is produced.

An effective way of producing this jet for a continuous cleansing action is to generate saturated steam in large volume and at low temperature and pressure, to divide this steam into two streams, one of which is used to produce the larger proportion of the watery content, and to superheat the other stream and then mix the two streams together, a portion of the superheated steam being thereby condensed to increase the water content of the mixture, and the remainder of the superheated steam, which is reduced at the time of mixture by heat exchange to a saturated steam of lower temperature, being utilized to form with the water of condensation a jet having the desirable characteristics described.

The efficiency of the cleansing jet may be further increased, particularly for the cleansing of oil or grease coated surfaces, by combining with the jet a suitable soluble detergent, such as soap, so that the cleansing agent may be employed in the form of a spray composed of mixed atomized soapy particles of water and low pressure steam vapor which will give a loosening action due to its heat and a cutting and washing action due to its volume of moisture and detergent content.

In accordance with my method, the saturated steam is utilized to agitate a body of this soap and by its condensation to supply water to form with the soap a hot solution, which solution is mixed with the superheated steam, a portion of which condenses and raises the temperature of the hot solution while adding through its water of condensation to its water content, the remainder of the superheated steam being reduced to a saturated steam vapor, the pressure of which is just sufficient to form a jet of proper characteristics.

Where soap, a hydrocarbon or other detergent is used, the superheated steam has a further valuable property in that, through its raising of the temperature of the solution and its addition by partial condensation to the watery content thereof, any small particles of free alkali or undissolved portions of the detergent will be dissolved so as to properly temper the solution and reduce it to the right strength, thereby obviating the possibility of an over-strength solution being supplied or one which will spot or otherwise mar the surface finish being treated.

One object of my invention is to provide a method and an apparatus whereby steam may be efficiently employed as a cleansing agent for the purposes and with the advantages stated.

Another object of the invention is to provide a method and an apparatus whereby steams of two different temperatures may be readily and efficiently formed and combined for the production of a cleansing jet having the desired characteristics stated.

Still another object of the invention is to provide a method and an apparatus whereby a detergent may be combined with the water of condensation from the steam and utilized in the most effective manner without injury to the surface to be treated.

Still another object of the invention is to provide a method and an apparatus for the production and combination of the components of the cleansing spray in a continuous manner and for continuous treatment of the surface and without periodic shut downs or interruptions in generation or of the necessity of particular care being taken in the process of generation for the production of steams of the exact temperatures and pressures desired.

Still another object of the invention is to provide a steam generating and mixing apparatus which is simple of construction, reliable and efficient in action, and which in operation requires a minimum amount of attention.

Still another object is to provide a relief cock on the soap or chemical container so that steam pressure therein may be relieved before said container is opened for refilling.

An important feature resides in securing the soap container to the generator in a permanent and rigid manner so as to prevent separation or relative displacement of the tank in shipping and handling, whereby the alinement and coordination of the pipe connections is preserved.

A further object is to provide a generator of the vertical coil type having its coils intermeshing and alternating in such a manner as to permit the placing of a maximum number of coils in a given space and to utilize the overlapping coils as baffles to deflect the upward passage of the heat units, whereby the greatest heating efficiency is had.

Another object is to provide a generator jacket with a removable cap, whereby access may be had readily to the coils for removal and inspection.

A construction designed to carry out the invention will be hereinafter described together with other features of the invention.

Figure 2:
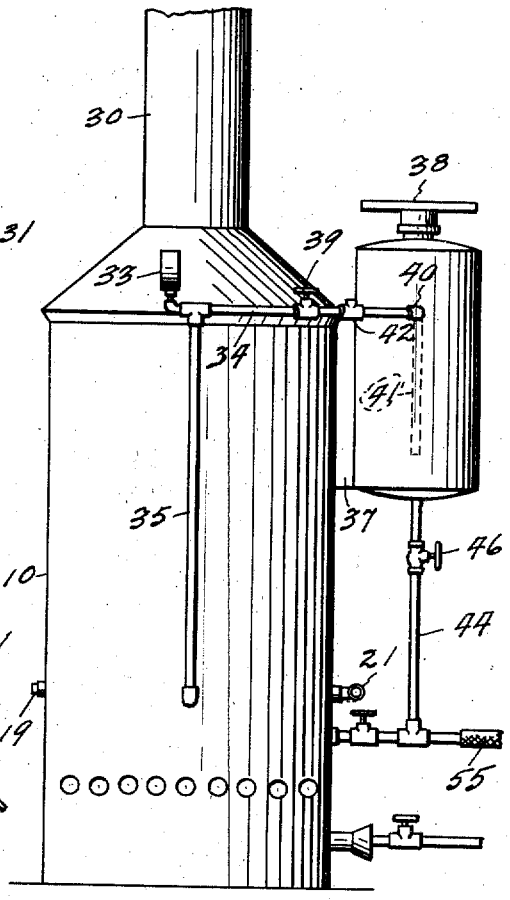
Figure 9:
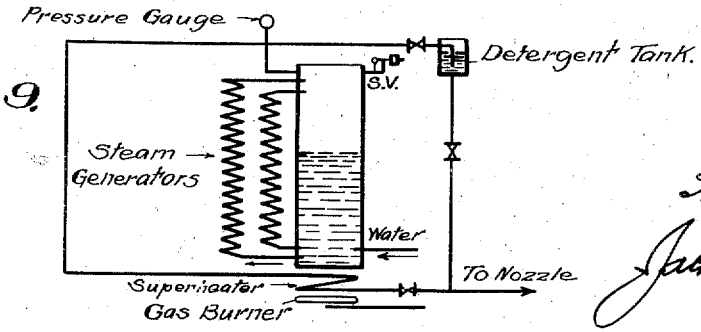
Figure 4:
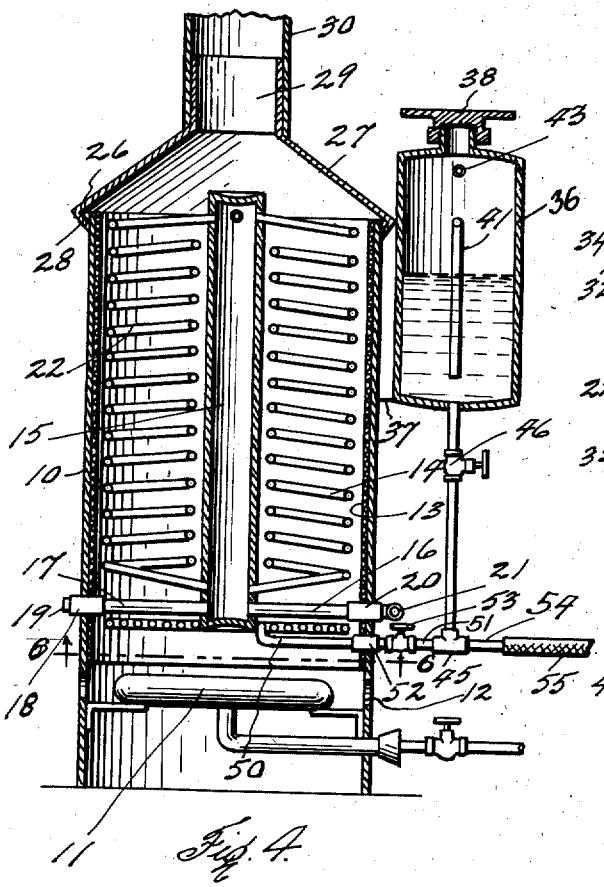
Figure 5:
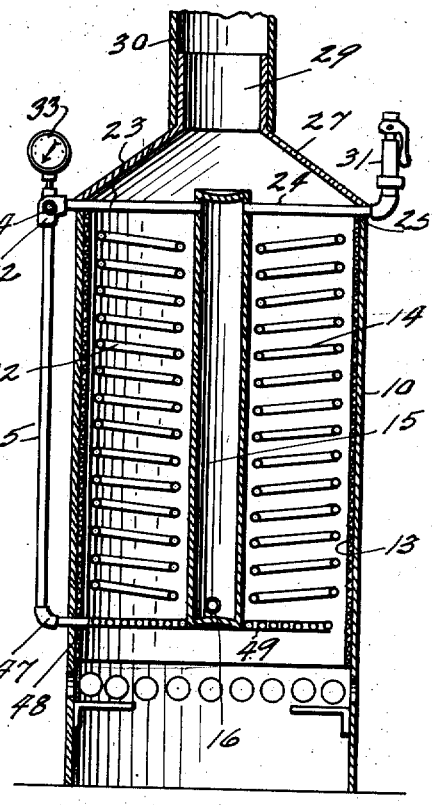
Figure 3:
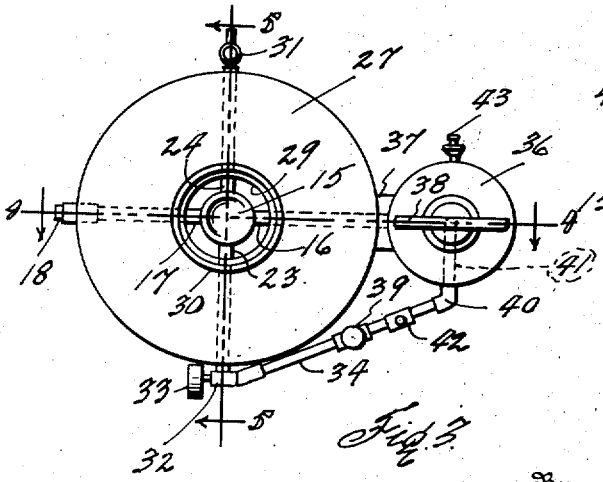
Figure 6:
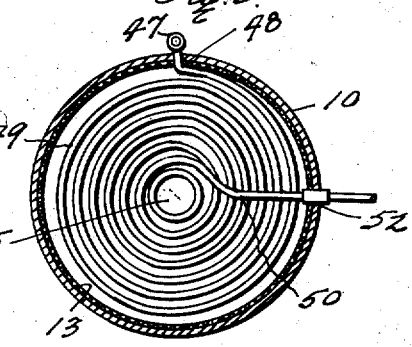
Figure 7:
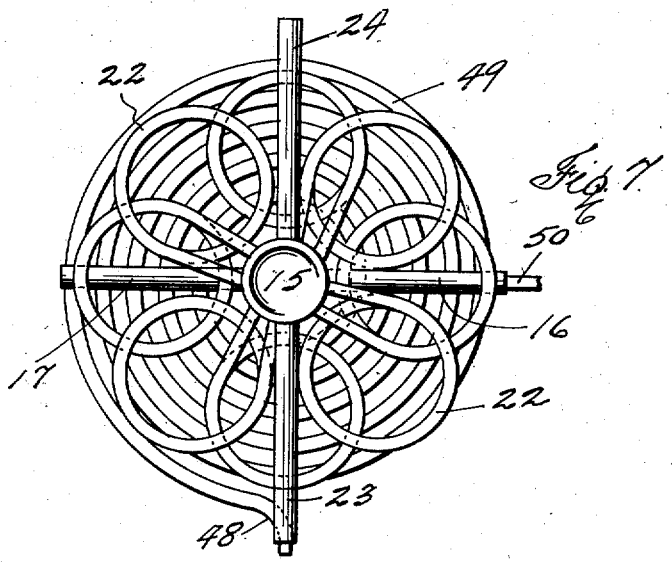
Figure 8:
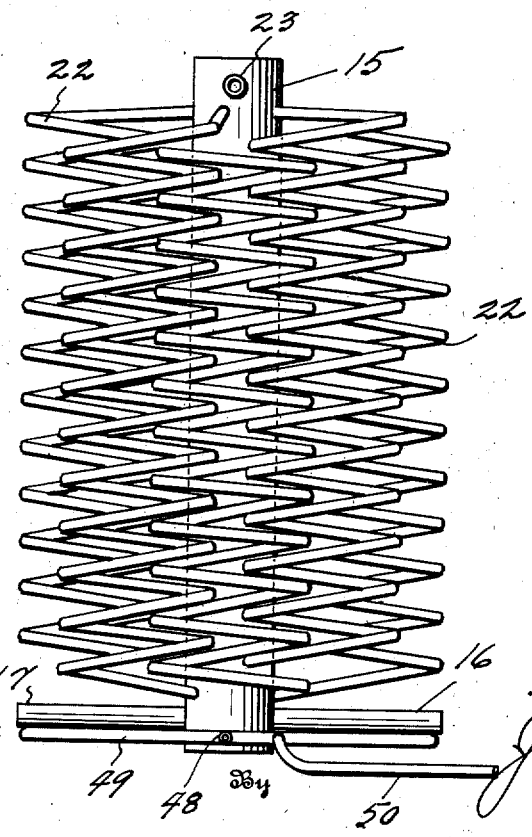

The invention will be more readily understood from a reading of the following specification and by reference to the accompanying drawings, in which an example of the invention is shown, and wherein:

Fig. 1 is an elevation of an apparatus constructed in accordance with my invention, Fig. 2 is a similar view at right angles thereto, Fig. 3 is a plan view of the apparatus, Fig. 4 is a vertical sectional view taken on the line 4—4 of Fig. 3, Fig. 5 is a vertical sectional view taken on the line 5—5 of Fig. 3, Fig. 6 is a horizontal cross-sectional view taken on the line 6—6 of Fig. 4, Fig. 7 is a plan view of the generating unit, Fig. 8 is an elevation of the same, and Fig. 9 is a diagrammatical view of the apparatus.

In the drawings the numeral 10 designates a vertical cylindrical metal jacket of suitable construction having a suitable fluid fuel burner 11 supported in its lower portion and surrounded by draft openings or perforations 12. Of course any suitable fire may be employed. Above the perforations the jacket has an insulating lining 13 of asbestos or similar material.

Within the jacket is disposed a coil steam generator unit 14. This unit includes a central water column 15 closed at each end. Diametrically alined pipes 16 and 17 extend from opposite sides of the lower end of the column. These pipes terminate within the lining 13. The pipe 17 has a coupling 18 extending through the jacket and receiving a plug 19. By removing the plug the pipes 16 and 17 may be cleaned out. The pipe 16 has a coupling 20 extending through the jacket and connected with a water supply or service pipe 21.

Above the pipes 16 and 17 a plurality of vertical coils 22 are arranged and have their lower ends connected with the lower end of the column 15 and their upper ends connected with the upper end of said column. These coils are disposed in a group about the column, each coil being vertically disposed and the coils of the groups are alternately coiled in opposite directions. By observing Figs. 7 and 8 it will be seen that alternate coils are spirally coiled to the left, while intermediate coils are spirally coiled to the right. This permits the right hand coils to extend between or intermesh with the left hand coils and vice versa. Such an arrangement allows the number of coils to be doubled in a given space and also provides sufficient overlapping of the coils to form barriers or baffles around which the heat units must pass in their upward journey. The increased heating surface and the retarded passages make for greater economy, rapidity and efficiency in the generation of steam.

The coils terminate below the top of the jacket. Diametrically opposite pipes 23 and 24 extend from the top of the column 15 over the coils and are received in notches 25 in the upper edge of the jacket. These pipes are at right angles to the pipes 16 and 17 and with the couplings 18 and 20 support the generator unit and hold it rigidly in the jacket. To remove the unit it is merely necessary to unscrew the couplings and lift the unit. The jacket has an out-turned flange or bead 26 at its upper edge and a conical cap 27 resting on said flange has its lower edge 28 slightly crimped under the flange. This fastens the cap on the jacket, but by springing the edge 28 outwardly the cap may be removed. The cap has a collar 29 receiving a stack 30.

The pipe 24 is connected with a safety valve 31 on the outside of the jacket, while the pipe 23 is screwed into a T joint 32. To one side of the joint is connected a steam gauge 33. A steam conducting pipe 34 leads from the other side of the joint and a second steam conducting pipe 35 extends downward from said joint. A vertical tank 36 is rigidly and permanently attached to the upper end of the jacket in any suitable manner, as by a pair of channel irons 37 welded to the jacket and to which the tank is welded. The tank extends above the jacket and has a cap 38 screwed thereon. The pipe 34 includes a globe valve 39 and is screwed into an elbow 40 connected with a pipe 41 extending into the tank. A check valve 42 is also included in the pipe 34 between valve 39 and the elbow and prevents back pressure in the pipe 34. The pipe 41 is bent downwardly in the tank (Fig. 4) and terminates near the bottom of said tank. By rigidly and permanently securing the tank to the jacket the pipe connections cannot be distorted or loosened in shipping. The pipe 41 will deliver steam at the bottom of the tank, whereby soap or other matter in the tank may be boiled.

A very important feature of the invention is a relief cock 43 mounted at the upper end of the tank. It will be seen that if the cap 38 was removed while the contents of the tank are under pressure, the operator might suffer severe burns and other injury. By closing the valve 39 and opening the cock 43, steam and other fluid under pressure is permitted to escape, after which the cap may be safely removed. A discharge pipe 44 leads from the bottom of the tank to a T joint 45 and includes a globe valve 46.

The pipe 35 which extends down from the joint 32 is connected with an elbow 47 attached to the extension 48 of a super-heating coil 49. The extension passes through the jacket and the coil is disposed horizontally around the lower end of the column 15 below the pipes 16 and 17. A pipe 50 leads from the center of the coil and is connected with a discharge pipe 51 by a coupling 52 extending through the jacket. The pipe 51 includes a globe valve 53 and is screwed into one side of the joint 45; while a pipe 54 is screwed into the other side of the joint. A rubber hose or other conductor 55 is attached to the pipe 54.

In operating the apparatus water is supplied through the pipes 21 and 16 to the bottom of the column 15. The burner 11 is ignited or suitable fire is supplied. The water will rise in the column and also will flow into the lower ends of the coils. Steam will be generated in the coils and flow into the upper end of the column. This steam which will be comparatively wet, i. e., saturated steam—steam at low temperature and pressure, will escape into the pipes 23 and 24. The saturated steam from the pipe 23 after passing into the T-joint 32 will be split into two portions or streams and flow through the pipes 34 and 35.

If the apparatus is to be used for steam cleaning automobiles or other structural work, a suitable soluble detergent compound is placed in the tank 36. Saturated steam from the pipe 34 is discharged from the lower end of the pipe 41 in the tank. This steam partially condenses and provides heat and hot water, whereby the detergent is boiled and a hot detergent solution is discharged through the pipe 44, when the valve 46 is opened. Any solution placed in the tank will thus be heated and diluted with hot water.

The steam passing down through the pipe 35 enters the superheating coil 49 which is directly over the burner 11. Saturated steam, the same as is supplied to the pipe 39, enters the coil 49 from the pipe 35. This steam in passing through the coil 49 is superheated or reheated, whereby its temperature is raised, but when discharged into the pipe 50, it is under substantially the same pressure as the steam or fluids throughout the entire generator.

By opening the valves 46 and 53 the hot detergent solution will flow through the pipe 44 into the T joint 45 when it will come into contact with the steam flowing through the pipe 51. This will heat the solution and also tend to condense the inflowing steam, with the result that a hot steam impelled detergent fluid under considerable velocity will be discharged through the hose 55. Such fluid as reaches the work will contain much moisture and the detergent or other solution will be sufficiently hot to function, but not hot enough to injure surfaces. The quantities of solution and steam may be controlled by manipulating the valves 46 and 53; while the pressure in the tank 36 may be controlled by the valve 39. By combining the hot detergent solution, secured by the condensing of a body of saturated steam on a soluble detergent compound, with a body of superheated steam, the temperature of the latter is lowered, while the temperature of the mixture as a whole is raised through the resulting heat exchange, so that the mixture, jetted by the steam pressure from the discharge nozzle, will consist of soapy water in an atomized state commingled with a low pressure steam, substantially steam vapor, which will at once condense on coming in contact with the surface and will be reduced to the temperature of hot water.

It is obvious that a generous supply of detergent liquid and steam under considerable velocity is highly desirable, as steam alone will remove grease, mud and other matter from the work. The particular generator herein set forth is very efficient in such generation, owing to its large number of coils in close confinement and the baffle feature, whereby the heat units are utilized to the greatest extent and a maximum heating surface is exposed.

It is pointed out that the steam carrying with it considerable condensation, when ejected from the hose, will not have the high temperature of a so-called "dry" steam; also that the solution which is suspended in the steam fluid will not have a boiling temperature. Such a spray will quickly condense and while the surface is adequately cleaned, it will not be injured. While it is preferred, in practice, to employ a detergent solution, containing soap or any equivalent cleaning agent, a steam jet without the admixture of a detergent therewith may be employed under some conditions. Such a jet will consist, as will be readily understood from the foregoing description, of atomized particles of hot water, formed by the condensation of the saturated steam and a portion of the superheated steam and steam vapor as a result of the heat exchange action. When the two streams are brought together, the steam vapor or low pressure steam will be of sufficient pressure, i. e., from 45 to 60 pounds, to give the required impulse pressure or velocity, but will condense quickly on coming in contact with the surface, so that no steam will be given off hot enough to injure the paint or other finish of the surface being treated. This is due to the fact that the presence of the water will reduce the steam temperature but the velocity behind the fluid will remain constant.

In either case, that is whether or not a detergent is used, the heat of the mixture will thin out and soften the oil or grease, while the water, under pressure, will exert a washing action on the surface, thereby securing an efficient cleansing action without harmful effects. Of course if paint or varnish is to be removed a drier or hotter solution may be required and this may be accomplished by reducing the quantity of water supplied to the generator and the supplying of less steam to the tank 36, as well as by increasing the heat.

Various changes in the size and shape of the different parts, as well as modifications and alterations, may be made within the scope of the appended claims.

What I claim, is:

1. The method of cleaning surfaces, which consists in generating saturated steam at a low temperature and pressure, dividing such steam into two portions, reducing the temperature of one portion of the steam so as to produce a condensate consisting of hot water or hot water and vapor, superheating the other portion of the steam, mixing the superheated steam with the condensate, and projecting the mixture by the pressure of such steam against the surface to be treated.

2. The method of cleansing surfaces, consisting in generating in large quantities saturated steam at a low pressure and temperature, dividing the steam into two portions, utilizing one portion of the steam to heat and by agitation disintegrate a soluble surface treating medium and by condensation to form therewith a hot solution, superheating the other portion of the steam to raise its temperature, then mixing the superheated steam and the hot solution and thereby reducing the temperature of the steam, and then conducting the mixture to the work.

3. A continuous method of removing surface accumulations, which consists in continuously generating saturated steam, dividing the same into two line streams, bringing one line stream of said steam in contact with a detergent and causing said steam by heat exchange, agitation and condensation to form with said detergent a hot solution, subjecting the other line stream of the steam to a superheating action, then conducting the resulting hot detergent solution and the superheated steam to a common point and commingling the same, and finally spraying the mixture upon the work.

4. In an apparatus of the character described, a steam generator for generating steam at low temperature and pressure, a tank, a superheater, connecting means between the outlet of the steam generator and inlets of the tank and superheater for dividing the steam as generated and leading one portion of the steam to the tank and another portion of the steam to the superheater, conductors leading from the outlets of the tank and superheater to a common point of connection, and a distributor leading from such point of connection.

5. In an apparatus of the character described, a steam generator for generating steam at low temperature and pressure and having an outlet at its upper end, a tank for containing a soluble detergent, a superheater arranged beneath the generator, a heater for heating both the generator and superheater, connecting means between the outlet of the steam generator and inlets of the tank and superheater for dividing the steam as generated and leading one portion of the steam to the tank and another portion of the steam to the superheater, conductors leading from the outlets of the tank and superheater to a common point of connection, and a distributor leading from such point of connection.

6. In an apparatus of the character described, a generator for generating steam under low pressure and temperature, a mixing tank adapted to contain a detergent and for the formation of a detergent therein, a solution discharge outlet leading from the tank, a steam superheater, a steam supply connection between the outlet of the steam generator and the mixing tank, a steam supply connection between the outlet of the generator and the superheater, and a commingling and discharge device communicating with the solution outlet of the tank and with said steam superheater.

7. In an apparatus of the character described, a steam generator for generating steam under low temperature and pressure, a mixing tank adapted to contain a detergent and for the formation of a detergent solution therein, a valved solution discharge pipe leading from said tank, a superheater, a valved steam supply connection from the outlet of the steam generator to the mixing tank, a steam supply connection from the outlet of the steam generator to the steam superheater, a valved supply pipe leading from the superheater and connected with the solution discharge pipe from the mixing tank, and a common discharge connection leading from said pipes at their point of connection.

8. In an apparatus of the character described, a steam generator for generating steam under low temperature and pressure, a superheater arranged beneath said generator and coaxially therewith, a common means for heating the steam generator and superheater, a mixing tank adapted to contain a detergent and for the formation of a hot detergent solution therein, a steam supply connection between the outlet of the generator and the mixing tank, a separate steam supply connection between the outlet of the steam generator and the superheater, valved discharge pipes leading from the mixing tank and the superheater and having a common point of connection, and a discharge device communicating with said connection.

9. In an apparatus of the character described, a steam generator for generating steam under low temperature and pressure, a mixing tank adapted to contain a detergent and for the formation of a hot detergent solution therein, a steam supply connection between the outlet of the steam generator and the mixing tank, a discharge outlet from said tank, a bypass connection between the outlet of the steam generator and said discharge outlet from the tank, a superheater arranged in said bypass connection, and a discharge device communicating with the discharge pipe from the tank and with said bypass connection beyond the outlet of the superheater.

10. In an apparatus of the character described, a jacket, a steam generating coil arranged in said jacket for generating steam under low pressure and temperature, a superheater coil arranged in the jacket beneath the first-named generator coil, a heating means arranged in the jacket beneath said coils for heating both coils, a tank supported by the jacket and adapted to contain a detergent and for the formation of a hot detergent solution therein, a pipe connecting the outlet of the steam generator coil with the tank, a pipe connecting the outlet of the steam generator coil with the inlet of the superheater coil, discharge pipes leading from the tank and superheater coil respectively, said pipes being connected at a common point exteriorly of the jacket, and a discharge device communicating with said pipes at their point of connection.

11. In an apparatus of the character described, means for producing steam at low temperature and pressure, means for dividing the steam as generated into two portions, means for bringing one portion of the steam into contact with a detergent so as to form therewith by heat exchange, agitation and condensation of the steam a hot detergent solution, means for superheating the other portion of the steam, means for mixing the superheated steam with the hot detergent solution, and means for discharging the mixture against the surface to be treated.

12. In an apparatus of the character described, a steam generator for generating steam under low pressure and temperature, a detergent tank, a cap closing the upper end of the tank, a pressure relief cock at the upper portion of the tank, a steam supply pipe leading from the outlet of the steam generator to the tank and terminating near the bottom thereof, a discharge pipe leading from the tank, a superheater, a steam supply pipe leading from the outlet of the steam generator to the superheater, a steam supply pipe leading from the superheater and connected with the discharge pipe leading from the tank, and a discharge pipe communicating with the two last-named pipes at their point of connection.

13. In an apparatus of the character described, a jacket, a steam generating unit arranged in said jacket and comprising a vertical central tubular column closed at both ends, a feed water pipe entering the lower end of the column, a mixing tank, a steam discharge pipe leading from the top of the column to said tank, an annular series of vertical pipe coils surrounding the column and having their upper and lower ends connected with the upper and lower ends of the column, alternate coils being coiled in the opposite direction from the intermediate coils, and all of said coils being intermeshed and overlapping, a horizontal superheater coil beneath said steam generating unit, a steam supply connection between the upper end of the column and said superheating coil, an outlet from the tank, and an outlet leading from the superheater coil and connected with the tank outlet.

14. In a surface treating apparatus of the character described, a steam generator, a detergent tank connected with the generator, a superheating coil auxiliary to the generator, a discharge pipe extending from the generator, a pipe for conducting a portion of the steam from the generator to the tank, a second pipe for conducting another portion of the steam from the generator to the superheating coil, and a discharge pipe connected in common with the superheating coil and the tank.

15. In an apparatus of the character described, an upright generator including a water container extending vertically of said generator and also having a plurality of steam generating coils connected with said water container, a detergent tank mounted rigidly on said generator, a conductor leading from the generator to the detergent tank for conducting a hot gaseous fluid of water content directly to the tank to form a hot detergent solution in said tank, a discharge pipe leading from the tank, a separate steam conductor leading from the generator and connected with the tank discharge pipe for mixing with and impelling the discharged hot detergent solution, and a distributing pipe for carrying the steam impelled hot solution to a point of final discharge.

16. In an apparatus of the character described, an upright generator including a water container extending vertically of said generator and also having a plurality of steam generating coils connected with said water container, a detergent tank mounted contiguous to said generator and in fixed relation thereto, a conductor leading directly from the water container of the generator to the detergent tank for conducting saturated steam to the tank to form a hot detergent solution in said tank, a discharge pipe leading from the tank, a separate steam conductor leading from the generator and connected with the tank discharge pipe for mixing with and impelling the discharged hot detergent solution, and a distributing conductor for carrying the steam impelled hot solution to a point of final discharge.

17. In an apparatus of the character described, a generator constructed to produce a hot gaseous fluid of water content having a temperature near the boiling point of water and also constructed to produce steam under the same pressure as that of the hot fluid, a detergent tank contiguous to the generator, a pipe leading directly from the generator to the tank for separately conducting the said hot fluid to said tank, said tank containing a detergent which is mixed with the hot fluid to form a hot detergent solution, a discharge pipe leading from the lower end of the tank for conducting the hot solution therefrom by gravity, a steam pipe leading from the generator for conducting steam to a point of connection with the discharge pipe for mixing with the hot solution, and a conductor extending from said point of mixture, the steam impelling said solution through said conductor.

18. In an apparatus for cleaning surfaces, a generator for generating a low temperature and a high temperature steam, a detergent container contiguous to the generator, a conductor for conveying the low temperature steam directly from the generator to the container to produce by condensation a hot detergent solution, a discharge conductor leading from the container and free from connection with the said steam conductor, and a second steam conductor connected with the generator for conveying the high temperature steam, the discharge conductor being connected with the second steam conductor, whereby the steam and hot solution are mixed and impelled, and means for conducting the steam impelled mixture from the said point of mixture to the work.

19. In an apparatus for cleaning surfaces, means for generating saturated steam, means for conveying a portion of said saturated steam to a detergent container and therein producing by condensation a hot detergent liquid solution, means for conducting said liquid solution from the container, means for heating the other portion of said steam, means for conducting said heated steam from the generator and mixing it with the hot solution, whereby said solution is impelled, and a conductor for carrying said steam impelled solution to the work.

20. In an apparatus for cleaning surfaces, a steam generator for producing low and high temperature steam, a conductor for carrying off low temperature steam from one portion of the generator, a detergent tank with which said first conductor is directly connected, a gravity discharge pipe leading from said tank and free from connection with the first conductor, a second steam conductor leading from a separate point of the generator from the first conductor for carrying off the high temperature steam, whereby steam may be separately supplied and independently conveyed by each of said conductors, the second steam conductor and the discharge pipe being connected, and a distributing conductor leading from the said point of connection.

21. The method of cleaning surfaces which consists in generating saturated steam, dividing such steam into at least two portions, forming a saponaceous solution with one portion of said saturated steam, heating another portion of said saturated steam, mixing the saponaceous solution with the heated portion of steam, and projecting the mixture upon the surface to be cleaned.

22. The method of cleaning surfaces which consists in producing a heated gaseous fluid of water content under a low pressure head, forming a saponaceous solution therewith, generating superheated steam, uniting the solution and steam, and projecting the mixture upon the surface to be treated.

23. The method of cleaning surfaces which consists in generating in large quantities saturated steam, utilizing a major portion of said saturated steam to form by condensation and agitation of a detergent material, a saponaceous solution, utilizing the minor portion of said steam to produce a steam having impelling properties, then mixing the saponaceous solution while hot with the impelling steam, and then conducting the mixture under the velocity of the impelling steam to the work.

24. In an apparatus for cleaning surfaces, a generator having a water inlet, means for conducting saturated steam from the generator, a tank for containing a detergent material and connected with said conducting means for receiving saturated steam directly from the generator in such quantities as to form by condensation a liquid detergent solution in said tank, a detergent solution discharge pipe leading from the tank, means for separately conducting steam from the generator at a higher temperature than the saturated steam, a connection between the tank discharge pipe and the second steam conductor for mixing the higher temperature steam with the liquid solution, whereby the latter is impelled by the velocity of the former, and a conductor leading from said connection for carrying said steam impelled solution to the work.

25. The method of cleaning surfaces which consists in generating saturated steam, utilizing a portion of said saturated steam to form by condensation and agitation of a soapy material, a saponaceous solution, utilizing another portion of said saturated steam to produce a higher temperature steam having impelling qualities, then mixing the saponaceous solution while hot with the impelling steam, then conducting the mixture under the velocity of the impelling steam, and finally discharging the mixture in a spray having a temperature at its point of contact with the work considerably below the boiling point of water, and whereby the excessive heat of the steam is dissipated in the atmosphere.

In testimony whereof I affix my signature.

STUART A. WIER.